United States Patent [19]
Doi et al.

[11] 4,385,832
[45] May 31, 1983

[54] LASER POWER TRANSMITTING OPTICAL FIBER DAMAGE DETECTING DEVICE

[76] Inventors: Yuzuru Doi, No. 2-2-26, Tohoku, Niiza-shi, Saitama; Noriaki Kawamura, No. 2-37-12, Maeno-cho, Itabashi-ku, Tokyo, both of Japan

[21] Appl. No.: 182,742

[22] Filed: Aug. 29, 1980

[30] Foreign Application Priority Data

Sep. 11, 1979 [JP] Japan .................. 54-116429

[51] Int. Cl.$^3$ ............................................ G01N 21/88
[52] U.S. Cl. ............................................... 356/73.1
[58] Field of Search ..................... 356/73.1; 350/96.33

[56] References Cited

U.S. PATENT DOCUMENTS

| | | | |
|---|---|---|---|
| 4,070,091 | 1/1978 | Taylor et al. | 350/96.33 |
| 4,134,642 | 1/1979 | Kapron et al. | 350/96.33 |
| 4,207,561 | 6/1980 | Steensma | 356/73.1 |

FOREIGN PATENT DOCUMENTS 2546269  4/1977  Fed. Rep. of Germany ..... 356/73.1

Primary Examiner—Vincent P. McGraw

[57] ABSTRACT

A device for detecting damage in an optical fiber for transmitting high power laser beams. The optical fiber has an incident end face and an emergent end face with the emergent end face being coated with either a transmission increasing or a reflection increasing coating. A focusing optical system is provided between the laser light source and the incident end face of the optical fiber to focus the laser light reflected from the emergent end face back through the incident end face. A detector for detecting damage is disposed in path of the reflected laser light focused by the focusing optical system and outside the path of the laser light applied to the incident face.

6 Claims, 3 Drawing Figures

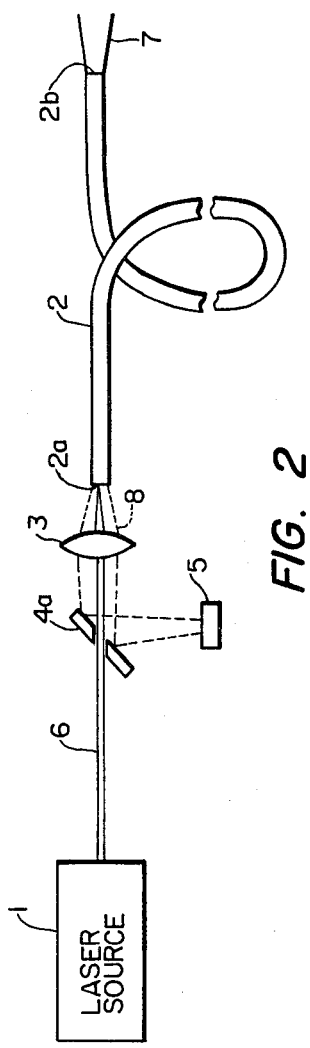
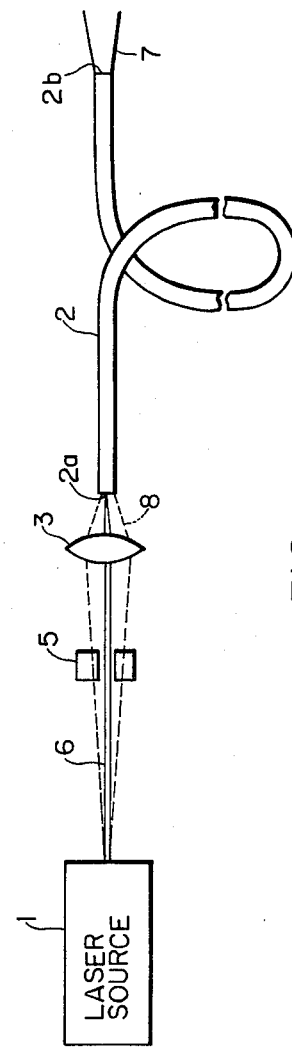
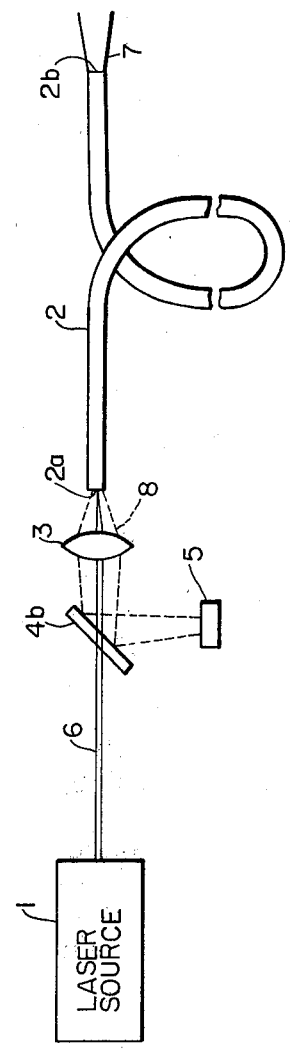

LASER POWER TRANSMITTING OPTICAL FIBER DAMAGE DETECTING DEVICE

BACKGROUND OF THE INVENTION

The present invention relates to a device for detecting damage in a laser power transmitting optical fiber.

The energy density of laser light is increased by focusing. High power lasers have been employed in industrial and medical applications which utilize focused laser light. To transmit high power laser light, a power transmitting optical fiber is ordinarily employed. The optical fiber is advantageous in that the transmission mechanism is simple and the optical fiber is flexible. However, it is still disadvantageous in the following points. The fiber may be damaged when it is subjected to bending, shock or high temperature. Especially when a fiber is used for medical operations, there is a high chance of damage. Thus, the reliability of such power transmission is considered to be insufficient.

Accordingly, an object of the invention is to provide a device which can dettect damage immediately when damage arises in such a laser power transmitting optical fiber.

SUMMARY OF THE INVENTION

In accordance with this and other objects of the invention, there is provided a device for detecting damage in a laser power transmitting optical fiber including a laser power transmitting optical fiber having an incident end face and an emergent end face. The emergent end face is provided with either a transmission increasing or a reflection increasing coating. A focusing optical system focuses reflected laser light emerging from the incident end face of the optical fiber, the reflected laser light being generated by light reflected from the emergent end face of the optical fiber. A detector for detecting damage is disposed in the path of the reflected laser light focused by the focusing optical system and outside the path of the laser light applied to the incident face. A mirror with a through-hole formed therein may be provided for reflecting the reflected light towards the optical detector. Alternatively, a half-silvered mirror may be used for this purpose.

BRIEF DESCRIPTION OF THE DRAWINGS

FIG. 1 is an explanatory diagram showing a first embodiment of the invention in which a mirror with a through-hole and a focusing lens are employed in a focusing optical system;

FIG. 2 is an explanatory diagram showing a second embodiment of the invention in which only a lens is employed in the focusing optical system; and FIG. 3 is an explanatory diagram showing a third embodiment of the invention in which a half-silvered mirror and a lens are employed in the focusing optical system.

DESCRIPTION OF THE PREFERRED EMBODIMENTS

Preferred embodiments of the invention will be described with reference to the accompanying drawings.

In FIG. 1, reference numeral 1 designates a laser source producing a laser beam such as a composite beam having a visible guide beam conponent and an invisible component passing through an optical fiber. The laser source may, for example, be an Nd-YAG laser source, an Ar laser source or a He-Ne laser source. Reference numeral 2 designates a laser power transmitting optical fiber. A laser light 6 emitted by the laser source 1, after being focused by a focusing lens 3, is applied to the incident end face 2a of the optical fiber 2 and emerges therefrom as an output laser light 7 from the emergent end face 2b of the optical fiber 2. The light is reflected to some extent by the emergent end face. A transmission enhancing coating or a reflection increasing coating is formed on the emergent end face 2b.

The focusing lens 3 has two functions. That is, the focusing lens 3 serves both to focus the laser light 6 before it is applied to the optical fiber 2 and to focus a laser light 8 which is returned after being reflected by the emergent end face 2b of the optical fiber 2. In FIG. 1, reference character 4a designates a mirror with a through-hole which allows the laser light 6 from the laser source 1 to pass therethrough and which reflects the laser light 8 reflected by the end face 2b towards an optical detector 5. The optical detector 5 is a photoelectric conversion element such as a photodiode which detects variations in the amount of laser light reflected.

A second embodiment of the invention is shown in FIG. 2. In this embodiment, the optical detectors 5 are positioned in the path of the reflected laser light 8 but outside the path of the laser ligh beam 6 from the laser source 1.

A third embodiment of the invention is as shown in FIG. 3. In this embodiment, the mirror 4a with the through-hole in FIG. 1 is replaced by a half-silvered mirror 4b.

If the optical fiber 2 is broken, such as when a cutout section is formed, the laser light from the laser source in the optical fiber damage detecting device constructed as described above cannot reach the emergent end face 2b of the optical fiber and instead emerge from and is reflected by the cut-out section. The cut-out section is not coated. Therefore, the laser light reflected by the cut-out section is higher in intensity than laser light reflected by the emergent end face 2b which has a transmission increasing coating and lower than laser light reflected by the emergent end face 2b which has a reflection increasing coating. Damage to the optical fiber 2 can thus be detected by detecting the variations of the amount of reflected laser light.

As is clear from the above description, the device of the invention is simple in arrangement and accordingly low in manufacturing cost and yet can readily detect damage to optical fibers. The device of the invention can be applied to laser machining devices, medical laser knives, and the like to significantly improve the reliability thereof.

What is claimed is:

1. A device for detecting damage in a laser power transmitting optical fiber comprising:
    a laser power transmitting optical fiber having an incident end face and an emergent end face, said emergent end face being coated with a material designed to alter an intensity of a reflected laser light generated when an incident laser light passes through said fiber and exits said fiber through said emergent end face, said coating material not being applied to other parts of said fiber except for said emergent end face thereof;
    a focusing optical system for focusing said reflected laser light after it emerges from said incident end face of said optical fiber; and detector means for detecting said damage, said detector means being disposed in the path of said reflected laser light focused by said focusing optical system and being disposed outside the path of said laser light applied to said incident face.

2. The damage detecting device of claim 1 wherein said coating material is a transmission increasing coating.

3. The damage detecting device of claim 1 wherein said coating material is a reflection increasing coating.

4. The damage detecting device of claim 1, 2 or 3 further comprising a mirror having a through-hole therein, said laser light applied to said incident end face passing through said through-hole, said mirror reflecting said reflected laser light towards said detector means.

5. The damage detecting device of claim 1, 2 or 3 further comprising a half-silvered mirror disposed in the path of said laser light applied to said incident end face, said half-silvered mirror reflecting laser light towards said detector means.

6. The damage detecting device of claim 1, 2 or 3 wherein said detector means comprises first and second optical detectors disposed in close proximity to and on opposite sides of said indicent laser light.

* * * * *

UNITED STATES PATENT AND TRADEMARK OFFICE
CERTIFICATE OF CORRECTION

PATENT NO. : 4,385,832
DATED : May 31, 1983
INVENTOR(S) : Yuzuru Doi et al.

It is certified that error appears in the above-identified patent and that said Letters Patent is hereby corrected as shown below:

On the title page insert:

-- [73]    Assignee:    Asahi Kogaku Kogyo Kabushiki Kaisha, Tokyo, Japan --.

Signed and Sealed this

Twenty-eighth Day of February 1984

[SEAL]

Attest:

GERALD J. MOSSINGHOFF

Attesting Officer     Commissioner of Patents and Trademarks